United States Patent
Suzuki

(10) Patent No.: US 10,156,362 B2
(45) Date of Patent: Dec. 18, 2018

(54) FUEL REFORMER CHAMBER WITH TUBULAR MESH INSERT SUPPORTING A CATALYST

(71) Applicant: MITSUBISHI HEAVY INDUSTRIES, LTD., Tokyo (JP)

(72) Inventor: Kenji Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 93 days.

(21) Appl. No.: 14/813,682

(22) Filed: Jul. 30, 2015

(65) Prior Publication Data

US 2016/0109134 A1    Apr. 21, 2016

(30) Foreign Application Priority Data

Oct. 15, 2014    (JP) ................. 2014-210958

(51) Int. Cl.

| F23R 3/40 | (2006.01) |
|---|---|
| F02C 3/20 | (2006.01) |
| F02C 7/22 | (2006.01) |
| F23R 3/28 | (2006.01) |
| F23K 5/08 | (2006.01) |
| F23K 5/20 | (2006.01) |
| F23R 3/00 | (2006.01) |

(Continued)

(52) U.S. Cl.

CPC ............... *F23R 3/40* (2013.01); *F02C 3/20* (2013.01); *F02C 3/205* (2013.01); *F02C 7/22* (2013.01); *F23K 5/08* (2013.01); *F23K 5/20* (2013.01); *F23R 3/005* (2013.01); *F23R 3/28* (2013.01); *C01B 3/384* (2013.01); *F02C 7/224* (2013.01); *F05D 2250/25* (2013.01); *F23C 2900/03002* (2013.01); *F23R 2900/00017* (2013.01); *F23R 2900/00018* (2013.01); *Y02T 50/675* (2013.01)

(58) Field of Classification Search
CPC .... F23R 3/40; F23C 2900/03002; F02C 7/22; F02C 7/222; F02C 7/224; C01B 3/384
USPC ................................................. 60/39.12, 736
See application file for complete search history.

(56) References Cited

U.S. PATENT DOCUMENTS

| 2,655,786 A | 10/1953 | Carr | |
|---|---|---|---|
| 3,323,304 A * | 6/1967 | Llobet | ...................... F02K 7/12 60/267 |

(Continued)

FOREIGN PATENT DOCUMENTS

| EP | 2 762 705 | 8/2014 |
|---|---|---|
| JP | 2002-513132 | 5/2002 |

(Continued)

OTHER PUBLICATIONS

Extended European Search Report dated Feb. 25, 2016 in corresponding European Application No. 15179517.6.

(Continued)

*Primary Examiner* — Arun Goyal
*Assistant Examiner* — James McGlynn
(74) *Attorney, Agent, or Firm* — Wenderoth, Lind & Ponack, L.L.P.

(57) ABSTRACT

A fuel supply system includes a fuel reformer in contact with at least one of a combustion chamber or a wall of the combustion chamber. The fuel reformer includes a reformer chamber wall enclosing a fuel reformer chamber, and a reforming catalyst support sheet in the fuel reformer chamber.

7 Claims, 15 Drawing Sheets

(51) Int. Cl.
 *C01B 3/38* (2006.01)
 *F02C 7/224* (2006.01)

(56) References Cited

U.S. PATENT DOCUMENTS

| | | | |
|---|---|---|---|
| 5,232,672 A * | 8/1993 | Spadaccini | B64D 13/00 422/198 |
| 6,189,310 B1 * | 2/2001 | Kalitventzeff | F01K 21/047 60/723 |
| 6,217,832 B1 | 4/2001 | Betta et al. | |
| 7,220,699 B2 * | 5/2007 | Chellappa | B01J 19/0053 502/238 |
| 7,727,495 B2 * | 6/2010 | Burd | B01D 53/9454 422/211 |

FOREIGN PATENT DOCUMENTS

| | | |
|---|---|---|
| JP | 2002-246055 | 8/2002 |
| JP | 2011-152527 | 8/2011 |
| JP | 2014-145328 | 8/2014 |
| WO | 01/29393 | 4/2001 |

OTHER PUBLICATIONS

Office Action dated Mar. 20, 2018 in Japanese Application No. 2014-210958, with English translation.

* cited by examiner

US 10,156,362 B2

FUEL REFORMER CHAMBER WITH TUBULAR MESH INSERT SUPPORTING A CATALYST

CROSS REFERENCE

This application claims priority from Japanese Patent Application No. JP 2014-210958 filed on Oct. 15, 2014, the disclosure of which is hereby incorporated by reference herein in its entirety.

TECHNICAL FIELD

The present invention relates to a fuel supply system, a jet engine, and a manufacturing method of the fuel supply system.

BACKGROUND ART

In order to stabilize combustion of a hydrocarbon fuel, it is desirable to increase a rate of low carbon number hydrocarbon in the fuel and to keep distribution of carbon number of the hydrocarbon contained in the fuel constant. In addition, the low carbon number hydrocarbon is in a gas state at room temperature. So, in case that the low carbon number hydrocarbon is stored in a fuel tank, it is not possible to store a large amount of the fuel. Therefore, it is conceived that high carbon number hydrocarbon, which is in a liquid state at room temperature, is stored in the fuel tank and the high carbon number hydrocarbon in the liquid state is decomposed into reformed fuel, which has low carbon number, using heat of a combustor.

As a related technique, Japanese Patent Application Publication JP 2014-145328 A discloses the fuel supply system which generates the reformed fuel by heat-decomposing the hydrocarbon fuel using heat of the combustion chamber of the scramjet engine. In addition, Japanese Patent Application Publication JP 2014-145328 A discloses the fuel supply system which cools the combustion chamber using the fuel reforming section. Japanese Patent Application Publication JP 2011-152527 A relates to a hydrogen catalyst member for dehydrogenation or hydrogenation. Japanese Patent Application Publication JP 2011-152527 A discloses that a porous anodized film is formed on a surface of an aluminum foil and a metallic catalyst is deposited on a surface of the porous anodized film.

SUMMARY

An object of the present invention is to provide a fuel supply system, a jet engine and a manufacturing method of the fuel supply system which increase reactivity of decomposition reaction for decomposing liquid fuel into reformed fuel.

According to some embodiment, a fuel supply system includes: a fuel reformer disposed to contact at least one of a combustion chamber or a wall of the combustion chamber; a first pipe configured to supply liquid fuel before reformation to the fuel reformer; and a second pipe configured to supply reformed fuel reformed by the fuel reformer to the combustion chamber. The fuel reformer includes: a fuel inlet connected to the first pipe; a fuel outlet connected to the second pipe; a reformer chamber wall enclosing a fuel reformer chamber; a reforming catalyst support sheet supporting a catalyst and disposed in the fuel reformer chamber; and a helical flow generating mechanism which generates a helical flow of fuel.

According to some embodiments, a jet engine includes above mentioned fuel supply system.

According to some embodiment, a manufacturing method is a manufacturing method of above mentioned fuel supply system. The method includes: disposing the fuel reformer such that the fuel reformer is contact with the combustion chamber or the wall of the combustion chamber; and disposing the reforming catalyst support sheet inside the fuel reformer chamber. The disposing the reforming catalyst support sheet includes inserting the reforming catalyst support sheet from the fuel inlet or the fuel outlet.

According to the present invention, it is possible to provide the fuel supply system, the jet engine and the manufacturing method of the fuel supply system which increase the reactivity of the decomposition reaction for decomposing the liquid fuel into the reformed fuel.

BRIEF DESCRIPTION OF THE DRAWINGS

The accompanying drawings are incorporated into the specification to assist in explaining some embodiments. The drawings are not to be construed as limiting the inventions to only those examples illustrated and described.

DESCRIPTION OF EMBODIMENTS

Figure 1:
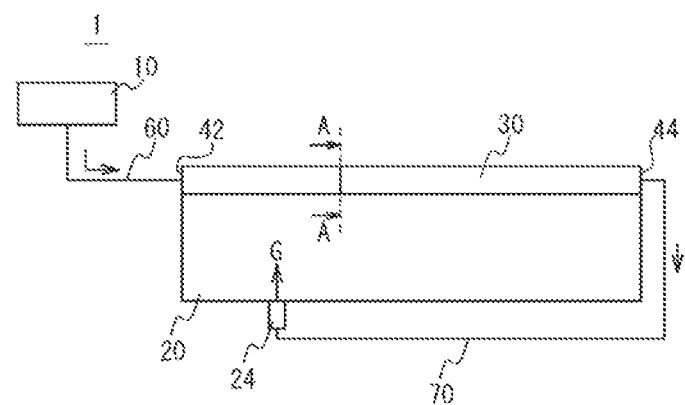
FIG. 1 is a schematic block diagram for indicating a configuration example of a fuel supply system according to some embodiments.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following, referring to the attached drawings, a fuel supply system, a jet engine and a manufacturing method of the fuel supply system will be explained.

Definition of Words

In this specification, "helical flow" means that fluid flowing through a passage has both a momentum component in a longitudinal direction of the passage and an angular momentum component about a longitudinal axis of the passage.

In this specification, "helical form" or "helical shape" means a formation having a curve that goes around a central tube or cone shape in the form of spiral or a part thereof.

(Outline of Fuel Supply System)

Referring to FIG. 1, outline of a fuel supply system 1 according to some embodiments will be explained. FIG. 1 is the schematic block diagram for indicating the configuration example of the fuel supply system 1.

The fuel supply system 1 includes a fuel tank 10, a combustion chamber 20, a fuel injector 24, a fuel reformer 30, a first pipe 60, and a second pipe 70.

The fuel tank 10 stores liquid fuel which contains high carbon number hydrocarbon as a main component. The liquid fuel is, for example, a jet fuel such as Jet A-1, Kerosene having 10-15 carbon atoms, Dodecene or combination thereof. The liquid fuel is supplied to the fuel reformer 30 via the first pipe 60. The first pipe 60 is a pipe which connects a fuel outlet of the fuel tank 10 to a fuel inlet 42 of the fuel reformer 30.

The fuel reformer 30 generates reformed fuel in a gas state by thermally decomposing the supplied liquid fuel with heat from the combustion chamber 20. The reformed fuel is, for example, hydrogen, methane, ethylene, ethane, propylene, propane or combination thereof. The fuel reformer 30 thermally decomposes the liquid fuel containing the high carbon number hydrocarbon as the main component, and generates the reformed fuel in the gas state containing low carbon number hydrocarbon as the main component.

The combustion chamber 20 is cooled by heat exchange between the liquid fuel and a wall of the combustion chamber. In addition, since thermal decomposition reaction of the liquid fuel is an endothermic reaction, the fuel reformer 30 and the combustion chamber 20 are cooled by the endothermic reaction. Cooling the combustion chamber using the fuel may be referred to as regenerative cooling.

The reformed fuel in the gas state is supplied to the combustion chamber 20 (more specifically, to the fuel injector 24) via the second pipe 20. The second pipe 70 is a pipe which connects a fuel outlet 44 of the fuel reformer 30 to the fuel injector 24. The fuel injector 24 injects the reformed fuel G in the gas state toward inside the combustion chamber 20. The injected reformed fuel G is burned in the combustion chamber.

(Fuel Reformer)

Figure 2:
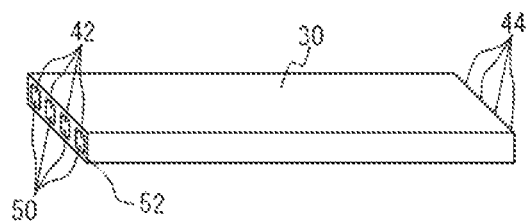
FIG. 2 is a schematic perspective view of a fuel reformer.
Figure 3A:
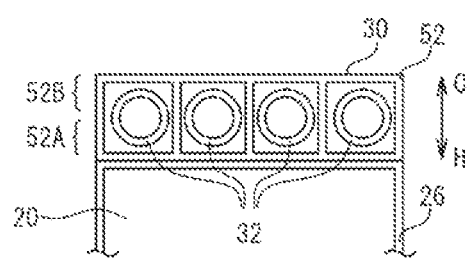
FIG. 3A is a cross sectional view taken along line A-A in FIG. 1 when viewed from the direction indicated by the arrows.
Figure 3B:
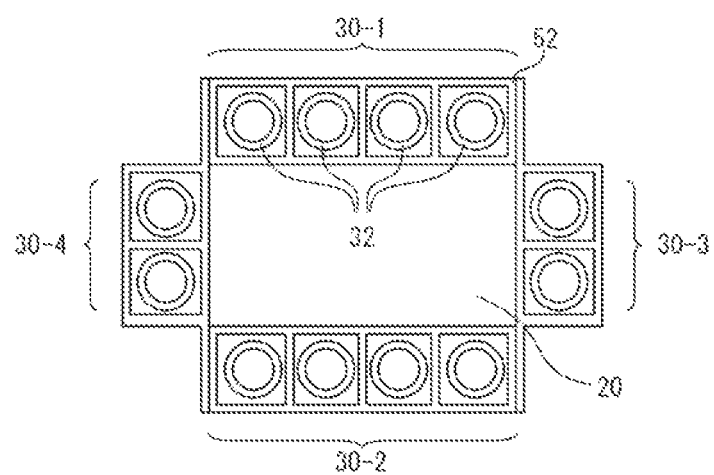
FIG. 3B is a cross-sectional view of the fuel reformer.
Figure 4:
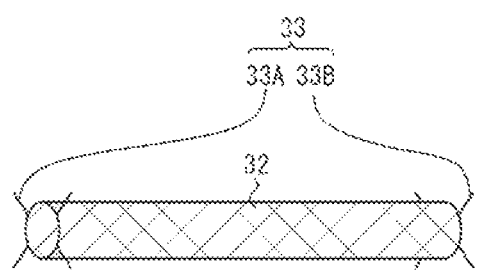
FIG. 4 is a schematic perspective view for indicating an example of a reforming catalyst support sheet.
Figure 5:
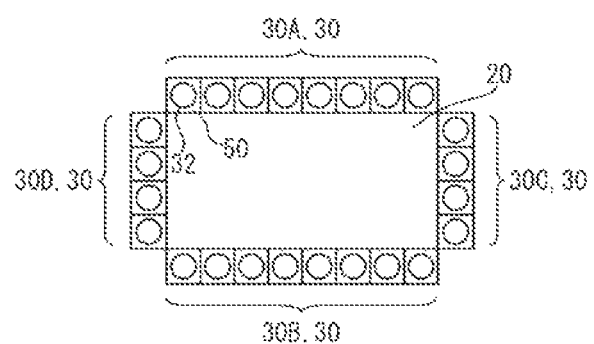
FIG. 5 is a schematic cross sectional view for indicating an example of an arrangement of the fuel reformer.

Referring to FIGS. 2 to 5, the fuel reformer will be explained. FIG. 2 is the schematic perspective view of the fuel reformer 30. FIG. 3A is a part of the cross sectional view of the fuel reformer 30 and is the cross sectional view taken along the line A-A in FIG. 1 when viewed from the direction indicated by the arrows. FIG. 3B is the cross sectional view of the fuel reformer, and is the diagram for indicating an alternative example. FIG. 4 is the schematic perspective view of the reforming catalyst support sheet 32 to be inserted in a fuel reformer chamber of the fuel reformer 30. FIG. 5 is the schematic cross sectional view for indicating the example of the arrangement of the fuel reformer 30.

The fuel reformer 30 includes the fuel inlet 42, the fuel outlet 44 and a reformer chamber wall 52 enclosing the fuel reformer chamber 50. The fuel reformer chamber 50 is a space enclosed by the reformer chamber wall 52, the fuel inlet 42 and the fuel outlet 44. In the example shown in FIG. 2, four fuel reformer chambers 50 are provided. However, the number of the fuel reformer chamber 50 is arbitrary. The fuel reformer chamber 50 is, for example, an elongated space extending from the fuel inlet 42 to the fuel outlet 44. The fuel reformer chamber may be referred to as a fuel passage in which reformation of the fuel is performed.

As shown in FIG. 3A, the fuel reformer 30 is disposed to contact a wall 26 of the combustion chamber 20. More specifically, a wall 52 of the fuel reformer 30 is disposed to contact of the wall 26 of the combustion chamber 20. In the fuel reformer chamber 50, the reforming catalyst support sheet 32 is disposed. At least a part of the reforming catalyst support sheet 32 is spaced from an inner surface of the reformer chamber wall 52. The whole of the reforming catalyst support sheet 32 may be spaced from the inner surface of the reformer chamber wall 52. The reforming catalyst support sheet 32 supports a catalyst for reforming the liquid fuel into the reformed fuel in the gas state. The catalyst is, for example, a zeolitic catalyst such as H-ZSM-5 catalyst, PGM (Platinum Group Metals: the platinum family) such as platinum catalyst, palladium catalyst and rhodium catalyst, a catalyst including at least one of oxide catalysts having large surface area, or a complex thereof.

A wall portion 52A (i.e. a combustion chamber side wall portion) of the reformer chamber wall 52, which is nearer to the combustion chamber 20, becomes higher temperature than an opposite side wall portion 52B, which is farther from the combustion chamber 20. That is, a portion of the reformer chamber wall 52 closer to the combustion chamber 20 is higher temperature H, and a portion of the reformer chamber wall 52 farther from the combustion chamber 20 is lower temperature C. Due to a temperature gradient of the reformer chamber 52, a temperature gradient is generated in the fuel flowing through the fuel reformer chamber 50. Therefore, there exists a possibility that a temperature of the liquid fuel flowing through the combustion chamber side, which is a high temperature side, exceeds over an upper limit of catalytic reaction temperature range. On the other hand, there exists a possibility that the temperature of the liquid fuel flowing through the opposite side from the combustion chamber side, which is a low temperature side, does not reach a lower limit of the catalytic reaction temperature range. Moreover, in case of using the reforming catalyst having low thermal expansion coefficient, there exists a possibility that the reforming catalyst is separated from the reforming catalyst support sheet 32 because the reforming catalyst cannot adapt to the thermal expansion of the reforming catalyst support sheet 32 due to the temperature gradient. In order to address above problem due to the temperature gradient, the fuel reformer according to some embodiments has a helical flow generating mechanism to generate a helical flow of the fuel (note that the fuel includes the liquid fuel, reformed fuel, or mixture of the liquid fuel and the reformed fuel). The mechanism for generating the helical flow of the fuel will be described later. According to some embodiments, the helical flow is passively generated by the reforming catalyst support sheet 32 or the reformer chamber wall 52. Therefore, a driving mechanism, which is necessary to actively generate the helical flow, can be omitted.

Note that the helical flow of the fuel means that the fuel induced from the fuel inlet 42 flows helically toward the fuel outlet 44 inside the elongated fuel reformer chamber 50. The helical flow of the fuel causes to reduce the temperature gradient of the fuel.

FIG. 3B is the diagram for indicating an alternative example of the fuel reformer. FIG. 3B is the cross-sectional view of the fuel reformer. The example shown in FIG. 3B is different from the example shown in FIG. 3A in a point in which the reformer chamber wall 52 of the fuel reformer 30-1 is used as the wall of the combustion chamber 20. In the example shown in FIG. 3B, the fuel reformer 30-1 is directly contact with the combustion chamber 20. In the example shown in FIG. 3B, a plurality of the fuel reformers 30-1 to 30-4 is provided. Then, one reformer is bonded to another reformer by welding, brazing etc. Note that, in the example shown in FIG. 3B, all of the combustion chamber walls are constituted by the fuel reformer walls. Alternatively, only a part of the combustion chamber walls may be constituted by the fuel reformer walls.

FIG. 4 is the schematic perspective view of an example of the reforming catalyst support sheet 32. In the example shown in FIG. 4, the reforming catalyst support sheet 32 is a mesh sheet. In case that the mesh sheet supporting the reforming catalyst is disposed in the fuel reformer chamber 50, it is possible to reduce an increase of the back pressure of the fuel in the fuel reformer chamber 50 (that is an increase of the back pressure of the fuel in the fuel passage) as compared to the case in which catalyst particles or catalyst pellets are randomly, directly filled in the fuel reformer chamber 50. In addition, in case that the reforming catalyst is supported on the mesh sheet, separation of the reforming catalyst from the support member is reduced as compared to the case in which the reforming catalyst is supported on a surface of the reformer chamber wall having a large temperature gradient. Note that, in some embodiments, it is possible to directly fill the catalyst particles or catalyst pellets in the fuel reformer chamber 50, or dispose the reforming catalyst on the surface of the fuel reformer chamber 50 in addition to dispose the reforming catalyst support sheet 32 supporting the reforming catalyst in the fuel reformer chamber 50.

With the reforming catalyst support sheet 32, a sheet supporting portion 33 is provided for supporting the reforming catalyst support sheet 32 in a state in which the sheet 32 is spaced from the surface of the fuel reformer chamber 50. The sheet supporting portion 33 is, for example, support legs. The sheet supporting portion 33 may include, for example, a plurality of inlet side supporting portions 33A and a plurality of outlet side supporting portions 33B. The sheet supporting portion 33 may movably support the reforming catalyst support sheet 32 with respect to the reformer chamber wall 52. In other words, the sheet supporting portion 33 may not be fixed to the reformer chamber wall 52. In the case that the reforming catalyst support sheet 32 is movable with respect to the reformer chamber wall 52 (in other words, the sheet 32 is supported in a non-restraint state), the reforming catalyst support sheet 32 is free of stress and strain due to restraint support. In this case, therefore, the separation of the reforming catalyst from the reforming catalyst support sheet 32 is further reduced.

FIG. 5 is the schematic cross sectional view (cross sectional view taken along a plane perpendicular to the longitudinal direction of the fuel passage) for indicating the example of the arrangement of the fuel reformer. As shown in FIG. 5, the fuel reformer 30 may be arranged to enclose the entire circumference of the combustion chamber 20. In the case that the fuel reformer 30 is arranged to enclose the entire circumference of the combustion chamber 20, a cooling effect for the combustion chamber 20 will be maximized. Alternatively, it is possible to arrange the fuel reformer 30 so as to contact only a part of the combustion chamber 20. Note that the number of the fuel reformer 30 may be one or the fuel reformer 30 may be divided into a plurality of portions (30A to 30D).

(Helical Flow Generating Mechanism)

Referring to FIGS. 6A to 11B, the helical flow generating mechanism will be explained.

The helical flow generating mechanism may include, for example, a helical formation (a helical formation portion).

Figure 6A:
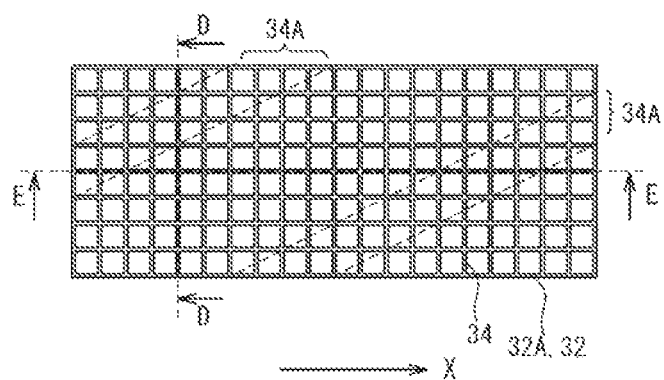
FIG. 6A is a development view of the reforming catalyst support sheet.

FIG. 6A is the development view of the reforming catalyst support sheet 32A for indicating an example of the helical formation portion.

In the example shown in FIG. 6A, the reforming catalyst support sheet 32A is a mesh sheet. The mesh sheet is made of, for example, metal. The mesh sheet is constituted by arranging, for example, linear members 34 (note that thread-like members and belt-shaped members are included in the linear members) in a mesh shape. Alternatively, the reforming catalyst support sheet 32A may be a sheet such as perforated sheet other than the mesh sheet.

In the reforming catalyst support sheet 32A, a thin-walled portion 34A is formed. In the example shown in FIG. 6A, thin-walled portion 34A is formed in the linear members 34. This thin-walled portion 34A constitutes the helical formation portion as well as the helical flow generating mechanism. More details will be explained later.

Figure 6B:
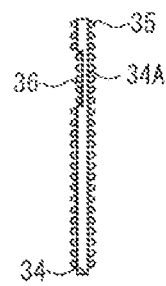
FIG. 6B is a cross sectional view taken along line D-D in FIG. 6A when viewed from the direction indicated by the arrows.
Figure 6C:
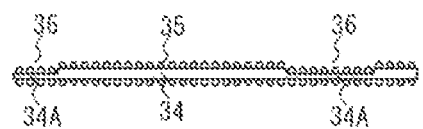
FIG. 6C is a cross sectional view taken along line E-E in FIG. 6A when viewed from the direction indicated by the arrows.

FIG. 6B is the cross sectional view taken along the line D-D in FIG. 6A when viewed from the direction indicated by the arrows. FIG. 6C is the cross sectional view taken along the line E-E in FIG. 6A when viewed from the direction indicated by the arrows. In the example shown in FIGS. 6A to 6C, the reforming catalysts 35 are supported on the whole of the linear members 34. In the example shown in FIGS. 6A to 6c, particles of the reforming catalysts 35 are supported on the linear members 34. Alternatively, it is possible that a layer of the reforming catalyst 35 is supported on the linear members 34.

The reforming catalyst support sheet 32A shown in FIGS. 6A to 6C is rolled to form a cylindrical shape, a polygonal cylindrical shape or a spiral sheet shape such that an X-axis shown in FIG. 6A corresponds to a longitudinal direction. Thus, the thin-walled portion 34A has the helical formation along the longitudinal direction. That is, by rolling the reforming catalyst support sheet 32A shown in FIGS. 6A to 6C to form the cylindrical shape, the polygonal cylindrical shape or the spiral sheet shape, the reforming catalyst support sheet 32A has the thin-walled portion 34A arranged in the helical shape. This thin-walled portion 34A arranged in the helical shape corresponds to the helical formation portion. Note that, in rolling the reforming catalyst support sheet 32A to form the cylindrical shape, the polygonal cylindrical shape or the spiral sheet shape, the sheet 32A may be rolled such that a concave portion 36 formed by the thin-walled portion 34A faces the inside of the rolled sheet. The reforming catalyst support sheet 32A having the helical formation portion is disposed in the fuel reformer chamber 50. As a result, a flow of the fuel passing through the fuel reformer chamber 50 becomes a helical flow by the helical formation portion (that is, the thin-walled portion 34A arranged in the helical shape).

By generating the helical flow of the fuel, the temperature gradient of the fuel is reduced. In addition, since the fuel is stirred by the helical flow, a gas phase of the fuel and a liquid phase of the fuel are uniformly mixed. By uniformly mixing the gas phase and the liquid phase, a bumping phenomenon (that is explosive boiling) of the fuel will be suppressed. By suppressing the bumping phenomenon of the fuel, it is possible to reduce the separation of the reforming catalyst 35 from the reforming catalyst support sheet 32A and to keep the high-reactivity of the decomposition reaction by the reforming catalyst 35. Moreover, by generating the helical flow of the fuel, the flow of the fuel becomes a turbulent flow. In the case that the flow is the turbulent flow, frequency of the contact between the reforming catalyst 35 and the fuel becomes higher and the reactivity of the decomposition reaction of the liquid fuel is increased as compared to the case in which the flow of the fuel is a laminar flow.

Figure 6D:
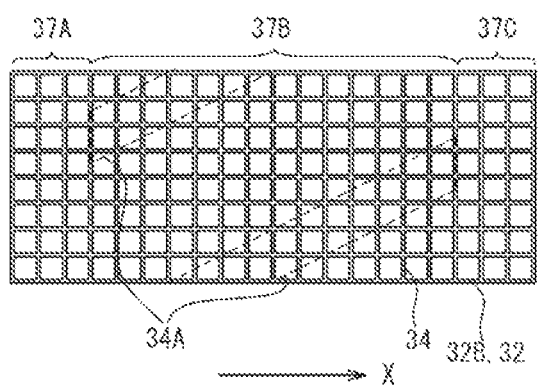
FIG. 6D is a development view of the reforming catalyst support sheet.

FIG. 6D is the diagram for indicating an alternative example of the reforming catalyst support sheet. FIG. 6D is the development view of the reforming catalyst support sheet 32B for indicating an example of the helical reformation portion. The reforming catalyst support sheet 32B is different from the reforming catalyst support sheet 32A shown in FIG. 6A in a point in which the thin-walled portion 34A is formed only in a middle portion 37B in the longitudinal direction and the thin-walled portion 34A is not formed in both an inlet side portion 37A and an outlet side portion 37C. In the other points, the reforming catalyst support sheet 32B is the same as the reforming catalyst support sheet 32A shown in FIG. 6A.

The inlet side portion 37A is a portion over which the liquid fuel is not sufficiently heated and the reformation of the liquid fuel is not much performed. Therefore, the significance of generating the helical flow of the fuel over the inlet side portion 37A is relatively low. In view of the above, in the example in FIG. 6D, the thin-walled portion 34A is not provided in the inlet side portion 37A. Note that the reforming catalyst 35 may not be supported on the inlet side portion 37A. Alternatively, an amount of the reforming catalyst 35 supported on the inlet side portion 37A may be relatively reduced. Note that, in applying the reforming catalyst 35 to the reforming catalyst support sheet 32B, it is possible that, for example, a masking tape is applied in advance to the portion of the sheet 32B where the reforming catalyst 35 is not necessary to be applied.

The middle portion 37B is a portion over which the liquid fuel is sufficiently heated and the reformation of the liquid fuel is mainly performed. By generating the helical flow of the fuel over the middle portion 37B, the temperature gradient of the fuel is reduced and the bumping phenomenon of the fuel is suppressed. Note that the reforming catalyst 35 is supported on the middle portion 37B.

The outlet side portion 37C is a portion over which the reformed fuel after the reformation passes. In other words, most of the fuel passing over the outlet side portion 37C is the reformed fuel, and the rate of the liquid fuel before the reformation is low over the outlet side portion 37C. Therefore, the significance of generating the helical flow of the fuel over the outlet side portion 37C is relatively low. In view of the above, in the example in FIG. 6D, the thin-walled portion 34A is not provided in the outlet side portion 37C. Note that the reforming catalyst 35 may not be supported on the outlet side portion 37C. Alternatively, an amount of the reforming catalyst 35 on the outlet side portion 37C may be relatively reduced.

According to the example shown in FIG. 6D, the thin-walled portion 34A is formed only in the middle portion 37B of the reforming catalyst support sheet 32B. Therefore, the portion where the thin-wall processing is to be performed is reduced, and consequently the cost is reduced. In addition, in the case that the reforming catalyst is supported only on the middle portion 37B, a total amount of required reforming catalyst is reduced, and consequently the cost is reduced.

Figure 6E:
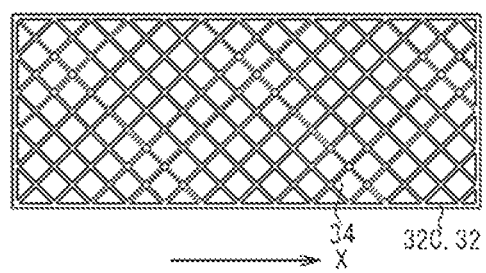
FIG. 6E is a development view of the reforming catalyst support sheet.

According to the examples shown in FIGS. 6A to 6D, a part of the linear members 34 is parallel to the X-axis, and the other part of the linear members 34 is perpendicular to the X-axis. However, embodiments are not limited to the configurations shown in FIGS. 6A to 6D. For example, as shown in FIG. 6E, some linear members 34 may be arranged so as to be inclined with respect to the X-axis.

According to the examples shown in FIGS. 6A to 6E, a shape of each mesh hole (reticulation) is a rectangular shape.

However, embodiments are not limited to the configurations shown in FIGS. 6A to 6E. The shape of the reticulation is arbitrary. By adopting the mesh sheet as the reforming catalyst support sheet 32, the fuel can pass through the mesh hole (reticulation). Therefore, the frequency of the contact between the fuel and the reforming catalyst 35 becomes higher and the reactivity of the decomposition reaction of the liquid fuel is increased.

Note that in case that a metal mesh sheet to which heat treatment has been applied in advance is used as the mesh sheet, a fine whisker structure (a whisker-like structure) exists on the surface of the metal mesh sheet. In this case, since the mesh sheet having the whisker structure more three-dimensionally entangles with the reforming catalyst, it is possible to reduce separation frequency of the reforming catalyst 35 from the mesh sheet.

Figure 6F:
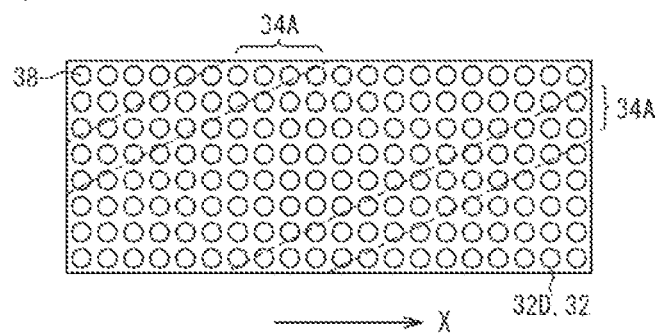
FIG. 6F is a development view of the reforming catalyst support sheet.

FIG. 6F is the diagram for indicating an alternative example of the reforming catalyst support sheet. FIG. 6F is the development view of the reforming catalyst support sheet 32D for indicating an example of the helical reformation portion. The reforming catalyst support sheet 32D is different from the reforming catalyst support sheet 32A shown in FIG. 6A in a point in which the sheet 32D is a perforated sheet having a plurality of perforations 38 through which the liquid fuel can pass. In the other points, the reforming catalyst support sheet 32D is the same as the reforming catalyst support sheet 32A shown in FIG. 6A.

Figure 7A:
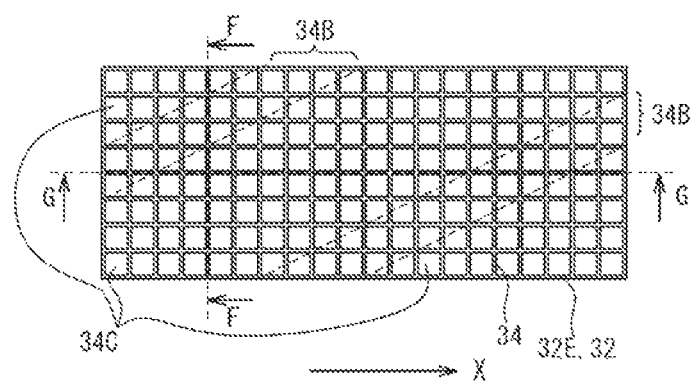
FIG. 7A is a development view of the reforming catalyst support sheet.
Figure 7B:
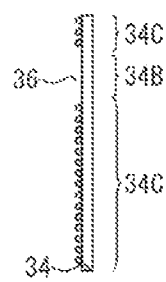
FIG. 7B is a cross sectional view taken along line F-F in FIG. 7A when viewed from the direction indicated by the arrows.
Figure 7C:
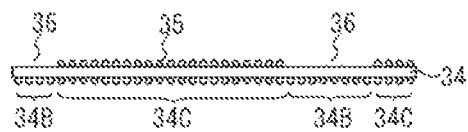
FIG. 7C is a cross sectional view taken along line G-G in FIG. 7A when viewed from the direction indicated by the arrows.

FIGS. 7A to 7C are diagrams for indicating an alternative example of the helical formation portion.

FIG. 7A is the development view of the reforming catalyst support sheet for indicating an example of the helical formation portion. In the example shown in FIG. 7A, the reforming catalyst support sheet 32E is a mesh sheet. The mesh sheet is constituted by arranging, for example, linear members (note that thread-like members and belt-shaped members are included in the linear members) in the mesh shape. Alternatively, the reforming catalyst support sheet 32E may be the sheet such as perforated sheet other than the mesh sheet.

The reforming catalyst support sheet 32E includes a catalyst non-supporting portion 34B which does not support the reforming catalyst, and a catalyst supporting portion 34C which supports the reforming catalyst. This catalyst non-supporting portion 34B constitutes the helical formation portion as well as the helical flow generating mechanism. More details will be explained later.

FIG. 7B is the cross sectional view taken along the line F-F in FIG. 7A when viewed from the direction indicated by the arrows. FIG. 7C is the cross sectional view taken along the line G-G in FIG. 7A when viewed from the direction indicated by the arrows. In the example shown in FIGS. 7A to 7C, the reforming catalyst 35 is supported on the catalyst supporting portion 34C of the linear members 34. On the other hand, the reforming catalyst 35 is not supported on the catalyst non-supporting portion 34B of the linear members 34. In the example shown in FIGS. 7A to 7C, the particles of the reforming catalyst 35 are supported on the linear members 34. Alternatively, the layer of the reforming catalyst 35 may be supported on the linear members 34. Note that, in the example shown in FIGS. 7B and 7C, the reforming catalyst 35 is supported only on one side surface of the linear members 34. Alternatively, the reforming catalyst 35 may be supported on both surfaces (upper side surface and lower side surface) of the linear members 34. In other words, the reforming catalyst 35 may be supported on entire circumference surface of the linear members 34.

The reforming catalyst support sheet 32E shown in FIGS. 7A to 7C is rolled to form the cylindrical shape, the polygonal cylindrical shape or the spiral sheet shape such that the X-axis shown in FIG. 7A corresponds to the longitudinal direction. Thus, the catalyst non-supporting portion 34B has the helical formation along the longitudinal direction. That is, by rolling the reforming catalyst support sheet 32E shown in FIGS. 7A to 7C to form the cylindrical shape, the polygonal cylindrical shape or the spiral sheet shape, the reforming catalyst support sheet 32E has the catalyst non-supporting portion 34B arranged in the helical shape. This catalyst non-supporting portion 34B arranged in the helical shape corresponds to the helical formation portion. Note that, in rolling the reforming catalyst support sheet 32E to form the cylindrical shape, the polygonal cylindrical shape or the spiral sheet shape, the sheet 32E may be rolled such that the concave portion 36 formed by the catalyst non-supporting portion 34B faces the inside of the rolled sheet. The reforming catalyst support sheet 32E having the helical formation portion is disposed in the fuel reformer chamber 50. As a result, the flow of the fuel passing through the fuel reformer chamber 50 becomes the helical flow by the helical formation portion (that is, the catalyst non-supporting portion 34B arranged in the helical shape).

By generating the helical flow of the fuel, the temperature gradient of the fuel is reduced. In addition, since the fuel is stirred by the helical flow, the gas phase of the fuel and the liquid phase of the fuel are uniformly mixed. By uniformly mixing the gas phase and the liquid phase, the bumping phenomenon (that is explosive boiling) of the fuel will be suppressed. By suppressing the bumping phenomenon of the fuel, it is possible to reduce the separation of the reforming catalyst 35 from the reforming catalyst support sheet 32E and to keep the high-reactivity of the decomposition reaction by the reforming catalyst 35. Moreover, by generating the helical flow of the fuel, the flow of the fuel becomes the turbulent flow. In the case that the flow is the turbulent flow, the frequency of the contact between the reforming catalyst 35 and the fuel becomes higher and the reactivity of the decomposition reaction of the liquid fuel is increased as compared to the case in which the flow of the fuel is the laminar flow.

In addition, according to the example shown in FIGS. 7A to 7C, it is not required to perform the thin-wall processing to the reforming catalyst support sheet 32E. Therefore, the manufacturing cost is reduces. In the example shown in FIGS. 7A to 7C, in applying the reforming catalyst 35 to the reforming catalyst support sheet 32E, it is possible that, for example, the masking tape is applied in advance to the catalyst non-supporting portion 34B.

Figure 8A:
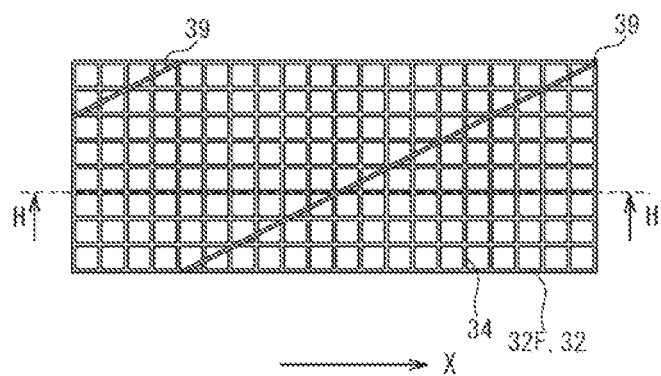
FIG. 8A is a development view of the reforming catalyst support sheet.
Figure 8B:
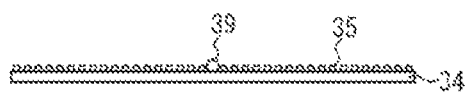
FIG. 8B is a cross sectional view taken along line H-H in FIG. 8A when viewed from the direction indicated by the arrows.

FIGS. 8A and 8B are the diagrams for indicating an alternative example of the helical formation portion.

FIG. 8A is the development view of the reforming catalyst support sheet for indicating an example of the helical formation portion. In the example shown in FIG. 8A, the reforming catalyst support sheet 32F is the mesh sheet. Alternatively, the reforming catalyst support sheet 32F may be the sheet such as perforated sheet other than the mesh sheet.

On the reforming catalyst support sheet 32F, a second linear member 39 is disposed. This second linear member 39 constitutes the helical formation portion as well as the helical flow generating mechanism. More details will be explained later.

FIG. 8B is the cross sectional view taken along the line H-H in FIG. 8A when viewed from the direction indicated by the arrows. In the example shown in FIGS. 8A and 8B, the particles of the reforming catalysts 35 are supported on the linear members 34. Alternatively, it is possible that the layer of the reforming catalyst 35 is supported on the linear members 34. Note that, on the second linear member 39, the reforming catalyst 35 may be supported or may not be supported.

The reforming catalyst support sheet 32F shown in FIGS. 8A and 8B is rolled to form the cylindrical shape, the polygonal cylindrical shape or the spiral sheet shape such that the X-axis shown in FIG. 8A corresponds to the longitudinal direction. Thus, the second linear member 39 has the helical formation along the longitudinal direction. That is, by rolling the reforming catalyst support sheet 32F shown in FIGS. 8A and 8B to form the cylindrical shape, the polygonal cylindrical shape or the spiral sheet shape, the reforming catalyst support sheet 32F has the second linear member 39 arranged in the helical shape. Note that, in rolling the reforming catalyst support sheet 32F to form the cylindrical shape, the polygonal cylindrical shape or the spiral sheet shape, the sheet 32F may be rolled such that the second linear member 39 faces the inside of the rolled sheet. The reforming catalyst support sheet 32F having the helical formation portion is disposed in the fuel reformer chamber 50. As a result, the flow of the fuel passing through the fuel reformer chamber 50 becomes the helical flow by the helical formation portion (that is, the second linear portion 39 arranged in the helical shape).

Figure 9A:
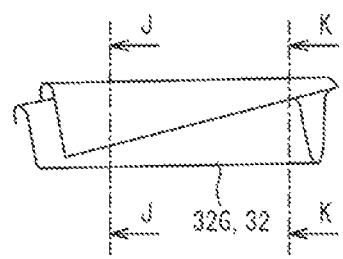
FIG. 9A is a schematic perspective view of the reforming catalyst support sheet.
Figure 9B:
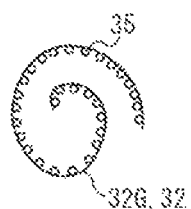
FIG. 9B is a cross sectional view taken along line J-J in FIG. 9A when viewed from the direction indicated by the arrows.
Figure 9C:
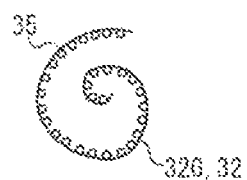
FIG. 9C is a cross sectional view taken along line K-K in FIG. 9A when viewed from the direction indicated by the arrows.

FIGS. 9A to 9C are the diagrams for indicating an alternative example of the helical formation portion.

FIG. 9A is the schematic perspective view of the reforming catalyst support sheet for indicating an example of the helical formation portion. In the example shown in FIG. 9A, the reforming catalyst support sheet 32G may be the mesh sheet or may be the perforated sheet. The reforming catalyst support sheet 32G is rolled helically. In the example shown in FIG. 9A, the helical formation portion is formed by rolling the reforming catalyst support sheet 32G helically. That is, the reforming catalyst support sheet 32G rolled helically itself constitutes the helical formation portion.

FIG. 9B is the cross sectional view taken along the line J-J in FIG. 9A when viewed from the direction indicated by the arrows. FIG. 9C is the cross sectional view taken along the line K-K in FIG. 9A when viewed from the direction indicated by the arrows. Note that, in the example shown in FIGS. 9A to 9C, the reforming catalyst 35 is supported only on one side surface of the reforming catalyst support sheet 32G. Alternatively, the reforming catalyst 35 may be supported on both surfaces (upper side surface and lower side surface) of the reforming catalyst support sheet 32G.

The reforming catalyst support sheet 32G is disposed in the fuel reformer chamber 50. As a result, the flow of the fuel passing through the fuel reformer chamber 50 becomes the helical flow by the helical formation portion (that is, the reforming catalyst support sheet 32G rolled helically).

Figure 10:
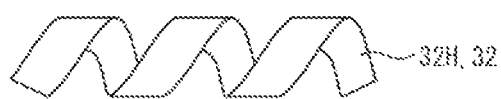
FIG. 10 is a schematic perspective view of the reforming catalyst support sheet.

FIG. 10 is the diagrams for indicating an alternative example of the helical formation portion.

FIG. 10 is the schematic perspective view of the reforming catalyst support sheet for indicating an example of the helical formation portion. In the example shown in FIG. 10, the reforming catalyst support sheet 32H may be a belt-shaped sheet (in other words, a ribbon sheet). The reforming catalyst support sheet 32H may be the belt-shaped sheet having mesh or the belt-shaped sheet having perforations. The reforming catalyst support sheet 32H is rolled helically. In the example shown in FIG. 10, the helical formation portion is formed by rolling the reforming catalyst support sheet 32H helically. That is, the reforming catalyst support sheet 32H rolled helically itself constitutes the helical formation portion. On the surface of the reforming catalyst support sheet 32H, the reforming catalyst 35 is supported.

The reforming catalyst support sheet 32H is disposed in the fuel reformer chamber 50. As a result, the flow of the fuel passing through the fuel reformer chamber 50 becomes the helical flow by the helical formation portion (that is, the reforming catalyst support sheet 32H rolled helically).

As mentioned above, referring to FIGS. 6A to 10, examples in which the helical formation portion is constituted by the reforming catalyst support sheet. Alternatively or additionally, the helical formation portion may be constituted by, for example, forming a helical groove on the reformer chamber wall 52. However, it is easier and more preferable to constitute the helical formation portion by the reforming catalyst support sheet as compared to constitute the helical formation portion on the reformer chamber wall 52.

(External Form of Reforming Catalyst Support Sheet)

FIGS. 11A to 11F are schematic cross sectional views for indicating examples of the external form of the reforming catalyst support sheet. FIGS. 11A to 11F are the cross sectional views along the plane perpendicular to the longitudinal direction of the fuel reformer chamber 50 (i.e. the fuel passage).

Figure 11A:
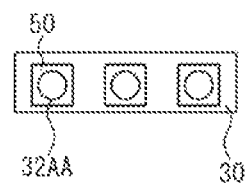
FIG. 11A is a schematic cross sectional view for indicating an example of an external form of the reforming catalyst support sheet.

In the example of FIG. 11A, the cross sectional shape of the reforming catalyst support sheet 32AA is a circular shape. In this case, overall external form of the reforming catalyst support sheet 32AA is a circular cylindrical shape. In the case that the shape of the reforming catalyst support sheet 32AA is the circular cylindrical shape, it is possible to increase a supporting area for the reforming catalyst as compared to the case in which a flat plate shape is adopted as the shape of the reforming catalyst support sheet.

Figure 11B:
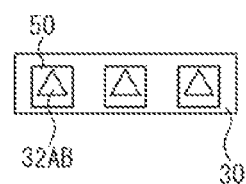
FIG. 11B is a schematic cross sectional view for indicating an example of the external form of the reforming catalyst support sheet.

In the example of FIG. 11B, the cross sectional shape of the reforming catalyst support sheet 32AB is a polygonal shape (e.g. a triangle shape). In this case, overall external form of the reforming catalyst support sheet 32AB is a polygonal cylindrical shape. In the case that the shape of the reforming catalyst support sheet 32AB is the polygonal cylindrical shape, it is possible to increase the supporting area for the reforming catalyst as compared to the case in which the flat plate shape is adopted as the shape of the reforming catalyst support sheet.

Figure 11C:
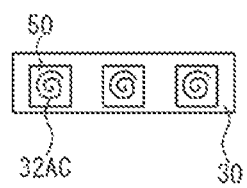
FIG. 11C is a schematic cross sectional view for indicating an example of the external form of the reforming catalyst support sheet.

In the example of FIG. 11C, the cross sectional shape of the reforming catalyst support sheet 32AC is a spiral shape. In this case, overall external form of the reforming catalyst support sheet 32AC is a spiral sheet shape. In the case that the shape of the reforming catalyst support sheet 32AC is the spiral sheet shape, it is possible to increase the supporting area for the reforming catalyst as compared to the case in which the flat plate shape is adopted as the shape of the reforming catalyst support sheet.

Figure 11D:
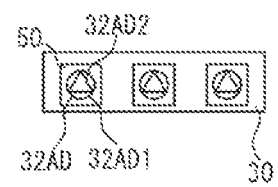
FIG. 11D is a schematic cross sectional view for indicating an example of the external form of the reforming catalyst support sheet.

In the example of FIG. 11D, the cross sectional shape of the reforming catalyst support sheet 32AD is a combination of a circle 32AD1 and a polygon 32AD2 (e.g. a triangle). The polygon 32AD2 is, for example, inscribed in the circle 32AD1. In this case, overall external form of the reforming catalyst support sheet 32AD is a combination shape of the circular cylinder and the polygonal cylinder. The reforming catalyst support sheet 32AD is formed by, for example, bonding a first sheet with the circular cylindrical shape and a second sheet with the polygonal cylindrical shape to each other. In the case that the shape of the reforming catalyst support sheet 32AD is the combination shape of the circular cylinder and the polygonal cylinder, it is possible to further increase the supporting area for the reforming catalyst.

Figure 11E:
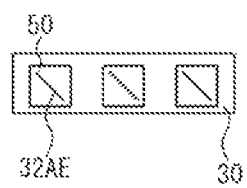
FIG. 11E is a schematic cross sectional view for indicating an example of the external form of the reforming catalyst support sheet.

In the example shown in FIG. 11E, the cross sectional shape of the reforming catalyst support sheet 32AE is a straight line. In this case, overall external form of the reforming catalyst support sheet 32AE is a flat plate shape. In the case that the shape of the reforming catalyst support sheet 32AE is the flat plate shape, it is easier to manufacture the reforming catalyst support sheet.

Figure 11F:
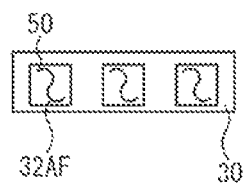
FIG. 11F is a schematic cross sectional view for indicating an example of the external form of the reforming catalyst support sheet.

In the example shown in FIG. 11F, the cross sectional shape of the reforming catalyst support sheet 32AF is a curved line (e.g. a wave shape). In this case, overall external form of the reforming catalyst support sheet 32AF is a curved plate shape. In the case that the shape of the reforming catalyst support sheet 32AF is the curved plate shape, it is possible to increase the supporting area for the reforming catalyst as compared to the case in which the flat plate shape is adopted as the shape of the reforming catalyst support sheet.

(Manufacturing Method of Fuel Supply System)

Figure 12A:
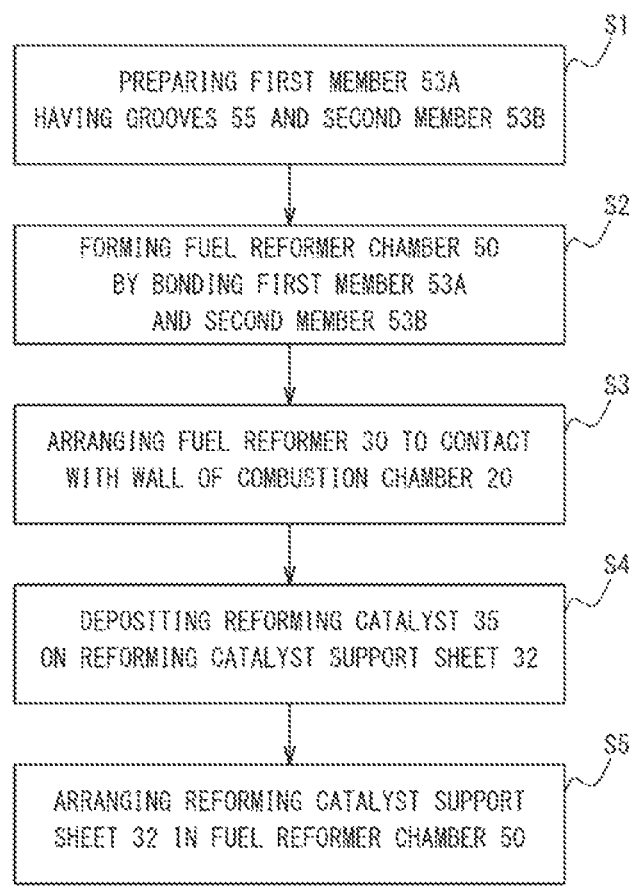
FIG. 12A is a flow chart for indicating processes to manufacture the fuel supply system.

Referring to FIGS. 12A to 12E, the manufacturing method of the fuel supply system will be explained. FIG. 12A is the flow chart for indicating processes to manufacture the fuel supply system.

Figure 12B:
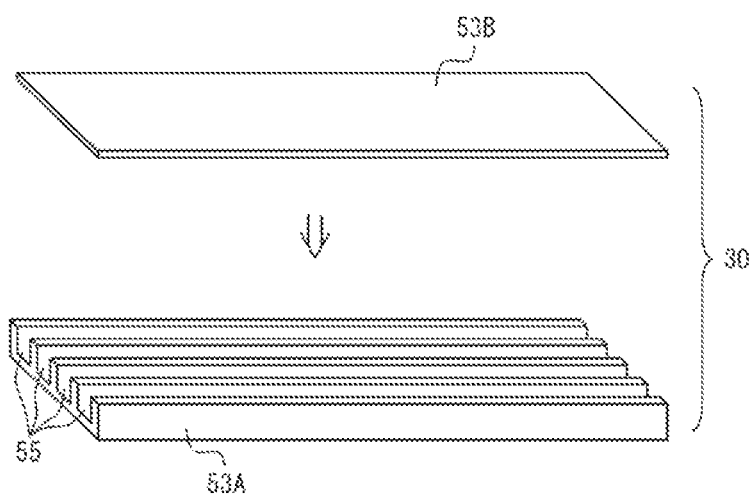
FIG. 12B is a diagram for indicating a process to manufacture the fuel reformer.

In the first step S1, a first member 53A of the fuel reformer 30 (e.g. a combustion-chamber-side member) and a second member 53B (e.g. a non-combustion-chamber-side member) are prepared (as shown in FIG. 12B). In the first member 53A, grooves 55 to form the fuel reformer chamber 50 (i.e. the fuel passage) are formed. A cross sectional shape of the groove 55 perpendicular to the longitudinal direction of the groove 55 is, for example, a rectangular shape. In the case that the cross sectional shape of the groove 55 is the rectangular shape, it is easier to form the groove 55.

In the second step S2, the first member 53A and the second member 53B are bonded (for example, bonded by the welding, brazing etc.). By the bonding, the fuel reformer chamber 50 is formed.

Figure 12C:
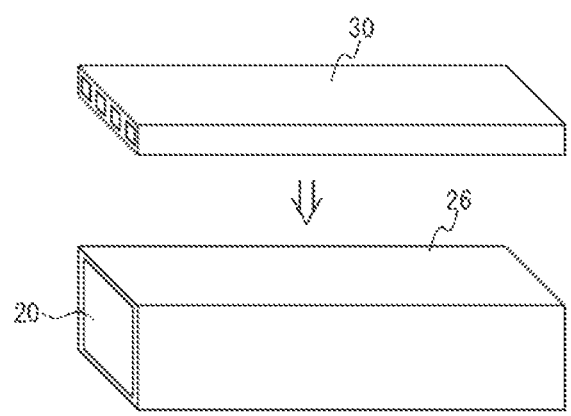
FIG. 12C is a diagram for indicating a process to manufacture the fuel reformer.

In the third step S3, the fuel reformer 30 is disposed to contact the wall 26 of the combustion chamber 20 (as shown in FIG. 12C). The wall 26 of the combustion chamber 20 and the fuel reformer 30 (more specifically, the first member 53A of the fuel reformer 30) are bonded. Note that the third step S3 may be performed before the second step S2.

Figure 12D:
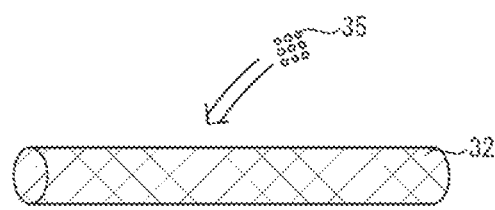
FIG. 12D is a diagram for indicating a process to manufacture the fuel reformer.

In the fourth step S4, the reforming catalyst 35 is deposited to the reforming catalyst support sheet 32 (as shown in FIG. 12D). The depositing of the reforming catalyst 35 is performed by, for example, immersing the reforming catalyst support sheet 32 into solution including the reforming catalyst, or applying the reforming catalyst in a paste form to the reforming catalyst support sheet 32. Note that the fourth step S4 may be performed before the first step S1, the second step S2 or the third step S3, or be performed in parallel with the first step S1, the second step S2 or the third step S3.

Figure 12E:
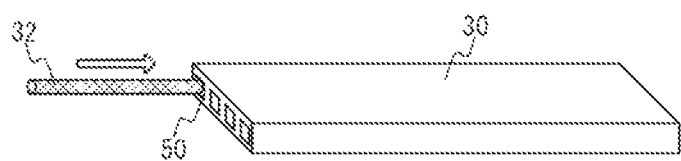
FIG. 12E is a diagram for indicating a process to manufacture the fuel reformer.

In the fifth step S5, the reforming catalyst support sheet 32 is disposed in the fuel reformer chamber 50. The process of disposing the reforming catalyst support sheet 32 is performed by inserting the reforming catalyst support sheet 32 in the fuel reformer chamber 50 from the fuel inlet or the fuel outlet (as shown in FIG. 12E). Note that the fifth step S5 may be performed before the second step S2. In the case that the fifth step S5 is performed before the second step S2, it is possible to insert the reforming catalyst support sheet 32 into the groove 55 (i.e. the fuel reformer chamber 50) from above the groove 55. However, in the case that the fifth step S5 is performed before the second step S2, there exists a possibility that the reforming catalyst is degraded by the temperature for bonding the first member 53A and the second member 53B to each other. Therefore, it is preferable that the fifth step S5 is performed after the second step S2. The fifth step S5 may be performed before the third step S3. However, in the case that the fifth step S5 is performed before the third step S3, there exists a possibility that the reforming catalyst is degraded by the temperature for bonding the combustion chamber wall 26 and the fuel reformer 30 to each other. Therefore, it is preferable that the fifth step S5 is performed after the third step S3.

Alternatively, in case that the combustion chamber is formed by bonding the walls of the fuel reformer 30 to each other (e.g. in the example case shown in FIG. 3B), above mentioned third step S3 is replaced by a step of bonding the walls of the fuel reformer 30 to each other. The step of bonding the walls of the fuel reformer 30 to each other may be performed before the fifth step S5 or after the fifth step S5. However, in the case that the step of bonding the walls of the fuel reformer 30 to each other is performed after the fifth step S5, there exists a possibility that the reforming catalyst is degraded by the temperature for bonding the walls of the fuel reformer 30 to each other.

In the manufacturing method of the fuel supply system according to some embodiments, the reforming catalyst is disposed in the fuel reformer chamber 50 by disposing the reforming catalyst support sheet 32 inside the fuel reformer chamber 50 from the fuel inlet or the fuel outlet. Therefore, it is possible to easily perform the manufacturing method of the fuel supply system.

(Size and Cross Sectional Shape of the Fuel Reformer Chamber)

Figure 13A:
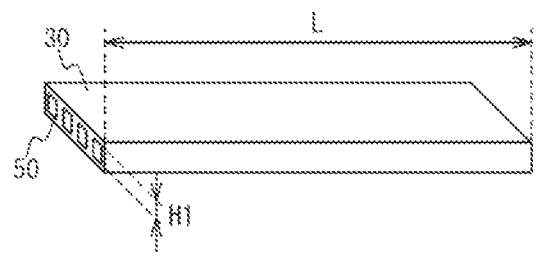
FIG. 13A is a schematic perspective view for indicating an example of a size of a fuel reformer chamber.
Figure 13B:
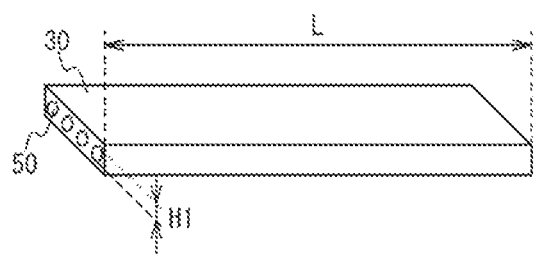
FIG. 13B is a schematic perspective view for indicating an example of a shape of the fuel reformer chamber.

FIG. 13A is the schematic perspective view for indicating an example of the size of the fuel reformer chamber. The size of the fuel reformer chamber 50 is determined under the consideration of the degree of cooling required for the combustion chamber, the condition in which excess temperature gradient is not generated in the fuel reformer chamber etc. A height H1 of the reformer chamber 50 is, for example, ranging from 2 mm to 20 mm. In the case that the height H1 is smaller than 2 mm, there exists a possibility that the cooling of the combustion chamber is insufficient. On the other hand, in the case that the height H1 is larger than 20 mm, there exists a possibility that the excess temperature gradient is generated in the fuel reformer chamber. The cross sectional shape of the fuel reformer chamber 50 along the plane perpendicular to the longitudinal direction of the fuel reformer chamber 50 may be a rectangular shape as shown in FIG. 13A. The rectangular shape includes a square shape, a substantially square shape, a rectangular shape and a substantially rectangular shape. Alternatively, the cross sectional shape of the fuel reformer chamber 50 along the plane perpendicular to the longitudinal direction of the fuel reformer chamber may be a circular shape as shown in FIG. 13B or another shape other than the rectangular shape and the circular shape. Note that the height H1 of the fuel reformer chamber 50 is a length (a height) along a direction perpendicular to the surface of the combustion chamber wall 26 to which the fuel reformer 30 is attached.

A length L of the fuel reformer chamber 50 along its longitudinal direction is, for example, ranging from 300 mm to 2000 mm. In the case that the length L is smaller than 300 mm, there exists a possibility that the reformation of the liquid fuel does not progress sufficiently. On the other hand, in the case that the length L is larger than 2000 mm, there exists a possibility that back pressure of the fuel flowing through the fuel reformer chamber becomes excessively high.

(Application to Jet Engine)

Figure 14:
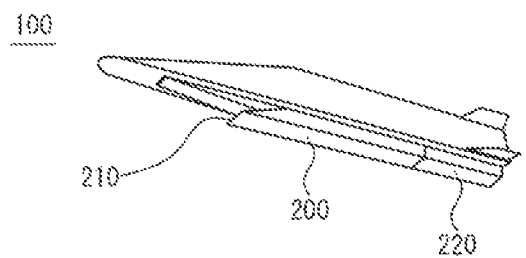
FIG. 14 is a schematic perspective view for indicating a configuration example of a flying body.
Figure 15:
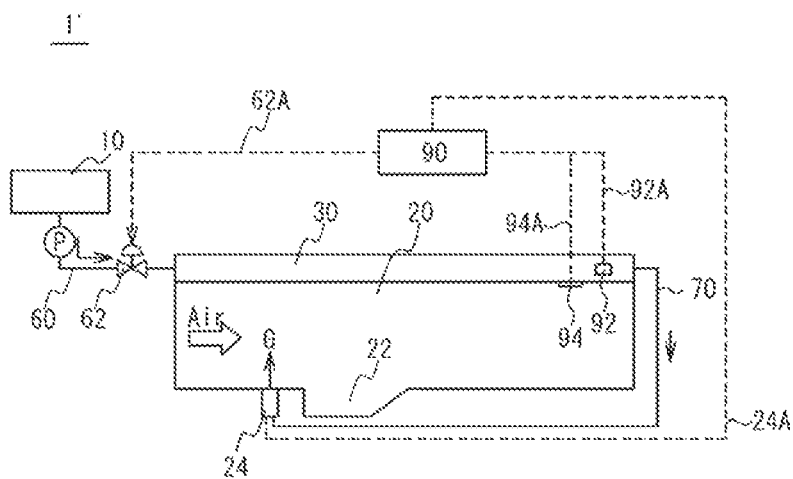
FIG. 15 is a schematic block diagram for indicating a configuration example of the fuel supply system according to some embodiment.

Referring to FIG. 14 and FIG. 15, the example in which the fuel supply system according to some embodiments is applied to the jet engine will be explained. FIG. 14 is the schematic perspective view for indicating a configuration example of the jet engine.

A flying body 100 includes the jet engine 200. The jet engine 200 is, for example a ramjet engine or a scramjet engine. The jet engine 200 burns a mixed gas of air taken from an inlet 210 and the fuel supplied from the fuel tank in the combustion chamber. Combustion gas is discharged from a nozzle 220 of the jet engine 200. The flying body 100 acquires a thrust by exhausting the combustion gas from the nozzle 220.

FIG. 15 is the schematic block diagram for indicating a configuration example of the fuel supply system 1' to be applied to the jet engine 200.

The fuel supply system 1' includes the fuel tank 10, the combustion chamber 20, the fuel injector 24, the fuel reformer 30, the first pipe 60 and the second pipe 70. The fuel supply system 1' may optionally include a pump P, a flow regulating valve 62, a flame holder 22, an electronic control unit 90 (ECU), a first sensor 92 and a second sensor 94.

The fuel tank 10 stores the liquid fuel containing the high carbon number hydrocarbon as the main component. The liquid fuel is supplied to the fuel reformer 30 via the first pipe 60 by activating the pump P.

The fuel reformer 30 generates the reformed fuel in the gas state by decomposing the supplied liquid fuel by the heat from the combustion chamber 20.

The combustion chamber 20 is cooled by the heat exchange between the liquid fuel and the wall of the combustion chamber. In addition, since the thermal decomposition reaction of the liquid fuel is the endothermic reaction, the fuel reformer 30 and the combustion chamber 20 are cooled by the endothermic reaction.

The reformed fuel in the gas state is supplied to the fuel injector 24 via the second pipe 70. The fuel injector 24 injects the reformed fuel G in the gas state toward inside the combustion chamber 20. The reformed fuel G, which is injected, is mixed with the air taken from the inlet, and the mixed gas is generated. The mixed gas is burned in the combustion chamber. Flame formed by the combustion is held in the flame holder 22. The flame holder 22 is, for example, a concave portion formed in the surface of the combustion chamber wall. The combustion gas generated by the combustion is exhausted from the nozzle.

The first sensor 92 is a sensor which measures a state parameter inside the fuel reformer chamber of the fuel reformer 30. The parameter to be measured is, for example, temperature, pressure, flow speed, flow rate etc. The second sensor 94 is a sensor which measures a state parameter inside the combustion chamber 20. The parameter to be measured is, for example, temperature, pressure, flow speed etc. The electronic control unit 90 adjusts the degree of opening of the flow regulating valve 62 based on a state of the fuel reformer chamber or a state of the combustion chamber, that is, based on information (a signal) from the first sensor 92 or information (a signal) from the second sensor 94. In addition, the electronic control unit 90 controls a fuel injection amount from the fuel injector 24 based on the state of the fuel reformer chamber or the state of the combustion chamber. The information from the first sensor 92 is transmitted to the electronic control unit 90 via a first signal line 92A, and the information from the second sensor 94 is transmitted to the electronic control unit 90 via a second signal line 94A. Further, the electronic control unit 90 controls the flow regulating valve 62 via a first control line 62A, and controls the fuel injector 24 via a second control line 24A.

Figure 16:
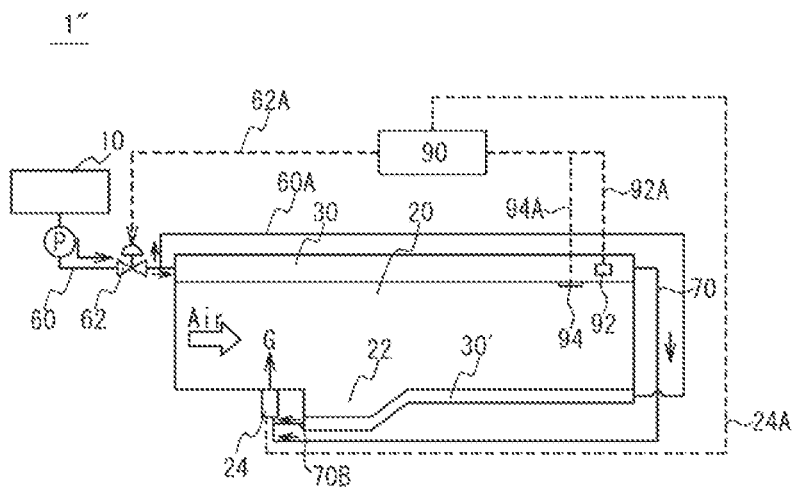
FIG. 16 is a schematic block diagram for indicating a configuration example of the fuel supply system according to some embodiment.

FIG. 16 is the diagram for indicating an alternative example of the fuel supply system. FIG. 16 is the schematic block diagram for indicating a configuration example of the fuel supply system 1" to be applied to the jet engine 200. In the example shown in FIG. 16, in the fuel reformer 30' formed apart from the fuel reformer 30 in addition to the fuel reformer 30, the reformation of the liquid fuel is performed. The fuel reformer 30' is disposed to contact a wall of the flame holder 22 of the combustion chamber. In the example shown in FIG. 16, it is possible to cool the wall of the flame holder 22, which is supposed to become a high temperature, by the fuel reformer 30'. Note that the supply of the liquid fuel to the fuel reformer 30' is performed via the first pipe (60 and 60A), the supply of the reformed fuel from the fuel reformer 30' to the fuel injector 24 is performed via the second pipe 70B.

In case that the fuel supply system according to some embodiments is mounted on the jet engine, it is possible to stabilize supersonic combustion using the reformed fuel. In addition, it is possible to increase loadable fuel since the liquid fuel before the reformation is loaded in the fuel tank. Further, it is possible to efficiently cool the combustion chamber of the jet engine by the fuel supply system. Moreover, since the fuel reformer is disposed to contact the combustion chamber, it is possible to reduce the size of the fuel supply system as compared to the case in which the fuel reformation is performed using another heat source other than the combustion chamber.

The present invention is not limited to the above mentioned embodiments. Various modifications can be performed on the above mentioned embodiments. Moreover, various techniques used in some embodiments or alternatives can be applicable to other embodiments or alternatives as long as the technical contradiction does not occur.

What is claimed is:
1. A fuel supply system comprising
   a fuel reformer extending along a longitudinal direction of a combustion chamber so as to contact at least one of the combustion chamber or a wall of the combustion chamber, and having a reforming catalyst for reforming fuel;
   a first pipe configured to supply liquid fuel before reformation to the fuel reformer; and
   a second pipe configured to supply reformed fuel reformed by the fuel reformer to the combustion chamber,
   wherein the fuel reformer comprises a plurality of fuel reformer chambers in parallel;
   wherein each of the plurality of fuel reformer chambers comprises: a fuel inlet connected to the first pipe;
   a fuel outlet connected to the second pipe;
   a reformer chamber wall enclosing one of the plurality of fuel reformer chambers; and
   a helical flow generating mechanism positioned in the one of the plurality of fuel reformer chambers;
   wherein the helical flow generating mechanism comprises:
   a reforming catalyst support sheet rolled so as to define a tube, wherein the reforming catalyst support sheet is a mesh-shaped sheet composed of a plurality of linear members, and the reforming catalyst is supported on the plurality of linear members, the mesh-shaped sheet having a thin-walled portion and a thick-walled portion; and a plurality of supporting members at respective ends of the tube for separating the tube from the reformer chamber wall; and wherein the thin-walled portion defines a helical shape on an inner circumference of the tube.

2. The fuel supply system according to claim 1, wherein a height of each of the plurality of fuel reformer chambers ranges from 2 Min to 20 mm.

3. The fuel supply system according to claim 1, wherein each of the plurality of fuel reformer chambers is an elongated chamber extending along the longitudinal direction of the combustion chamber from the fuel inlet to the fuel outlet, and wherein a cross-sectional shape of each of the plurality of fuel reformer chambers perpendicular to the longitudinal direction of the combustion chamber is a rectangular shape.

4. The fuel supply system according to claim 1, wherein the thin-walled portion is in a central portion of the tube.

5. A jet engine comprising the fuel supply system according to claim 1.

6. A fuel supply system comprising:

a fuel injector configured to inject a reformed fuel in a combustion chamber;

a fuel reformer extending along a longitudinal direction of the combustion chamber so as to contact at least one of the combustion chamber or a wall of the combustion chamber, and having a reforming catalyst for reforming fuel;

a first pipe configured to supply liquid fuel before reformation to the fuel reformer; and a second pipe configured to supply the reformed fuel reformed by the fuel reformer to the fuel injector, wherein the fuel reformer comprises a plurality of fuel reformer chambers in parallel;

wherein each of the plurality of fuel reformer chambers comprises:

a fuel inlet connected to the first pipe;

a fuel outlet connected to the second pipe;

a reformer chamber wall enclosing one of the plurality of fuel reformer chambers; and a helical flow generating mechanism positioned in the one of the plurality of fuel reformer chambers;

wherein the helical flow, generating mechanism comprises:

a reforming catalyst support sheet rolled so as to define a tube, wherein the reforming catalyst support sheet is a mesh-shaped sheet composed of a plurality of linear members, and the reforming catalyst is supported on the plurality of linear members, the mesh-shaped sheet having a thin-walled portion and a thick-wailed portion; and a plurality of supporting members at respective ends of the tube for separating the tube from the reformer chamber wall; and wherein the thin-walled portion defines a helical shape on an inner circumference of the tube.

7. The fuel supply system according to claim 6, wherein the thin-walled portion is in a central portion of the tube.

* * * * *